United States Patent [19]

Gammans

[11] 3,929,873
[45] Dec. 30, 1975

[54] OXIDATION OF POLYETHYLENE GLYCOLS TO DICARBOXYLIC ACIDS

[75] Inventor: William J. Gammans, Longview, Tex.

[73] Assignee: Eastman Kodak Company, Rochester, N.Y.

[22] Filed: Oct. 23, 1973

[21] Appl. No.: 408,764

[52] U.S. Cl. ............................................. 260/531 R
[51] Int. Cl.² ......................................... C07C 51/26
[58] Field of Search ..................... 260/531 R, 531 C

[56] References Cited
UNITED STATES PATENTS

| | | | |
|---|---|---|---|
| 3,342,858 | 9/1967 | Fuhrmann et al. | 260/531 R |
| 3,407,220 | 10/1968 | Williams et al. | 260/531 R |
| 3,799,977 | 3/1974 | Rutledge | 260/531 R |

FOREIGN PATENTS OR APPLICATIONS 1,035,639  8/1958  Germany.......................... 260/531 R Primary Examiner—Lorraine A. Weinberger
Assistant Examiner—Michael Shippen
Attorney, Agent, or Firm—D. B. Reece, III; Edward R. Weber

[57] ABSTRACT

Polyethylene glycols of the type

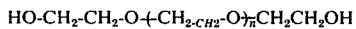

where $n$ is 0 or 1, can be converted to the corresponding dicarboxylic acids of the formula:

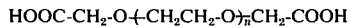

where $n$ is as previously defined, by oxidation in the presence of a platinum catalyst.

16 Claims, No Drawings

OXIDATION OF POLYETHYLENE GLYCOLS TO DICARBOXYLIC ACIDS

This invention relates to an improved process for the production of dicarboxylic acids. More particularly, it relates to an improved process for the oxidation of polyethylene glycols to the corresponding dicarboxylic acids.

It is known to oxidize polyethylene glycols to the corresponding carboxylic acids with nitric acid, but this method of oxidation possesses many serious disadvantages. Thus, with the higher molecular weight glycols, hydrolysis of the ether linkages becomes appreciable, undesirable nitrate and nitrite esters are formed which are difficult to remove, and aldehydic condensation products are also formed which are practically impossible to remove. In addition, nitric acid must be used in excess and removal of the residual acid is difficult and expensive. Likewise, chromic acid has been used for similar oxidations. However, when dicarboxylic acids are produced from about 5 to about 5.5 molecular portions of chromic acid must be used for each molecular portion of polyethylene glycol fed. Other means of obtaining the desired acids are recorded but these are of academic interest only, the processes being either too expensive or giving unsatisfactory yields. Platinum catalyzed oxidations of related alkoxyalkanols to corresponding alkoxyalkanoic acids are reported in U.S. Pat. No. 3,342,858. The inventors in that patent, however, stress the need for carrying out the oxidation in the presence of excess caustic.

It is, therefore, an object of the present invention to oxidize polyethylene glycols to the corresponding dicarboxylic acids.

A further object of this invention is to provide a process for the oxidation of polyethylene glycols to the corresponding dicarboxylic acids which does not require the use of nitric acid.

Still another object of this invention is to provide a process for oxidation of polyethylene glycols to the corresponding dicarboxylic acids which does not require the presence of expensive oxidizing agents.

Additional objects and advantages of this invention will be apparent from the following detailed description thereof.

In accordance with the present invention, it has been found that polyethylene glycols of the formula
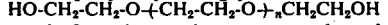
where $n$ is 0 or 1, can be converted to the corresponding dicarboxylic acids of the formula
where $n$ is as previously set forth, by oxidation in the presence of a platinum catalyst. The platinum catalyst is preferably platinum on a support such as carbon, but finely divided platinum metal such as that produced by reduction of platinum oxide can also be used. Catalysts consisting of from about 1% to about 10%, preferably about 3% to about 6%, platinum on finely divided carbon have been found to be quite suitable. Percentages are weight percent based on total catalyst weight. Satisfactory catalysts are commercially available.

The reaction is preferably carried out in an inert solvent with the preferred solvent being water, although any solvent that is nonreactive and miscible with the feed material and reaction products may be used. Other suitable solvents include p-dioxane and tetrahydrofuran. The glycol concentration in the feed material should be from about 3 to 20 percent by weight, preferably for reasons of production rate and maximum selectivity from about 10 to about 15 percent by weight.

The reaction can be carried out under relatively mild conditions of temperature and pressure. Temperatures of from about 20°C. to about 80°C. can be employed advantageously with a preferred temperature for maximum rate and selectivity being from about 40°C. to about 50°C. Pressures of from about atmospheric up to about 1500 psig can be employed with good results. Pressures higher than atmospheric offer no advantages, however.

The oxidizing gas can be oxygen or an oxygen-containing gas such as air. Whereas pure oxygen can satisfactorily accomplish the desired conversion, dilution of the oxygen with an inert gas such as nitrogen, helium, argon, $CO_2$ or other similar gas is preferred. No criticality is found in the concentration of oxygen in the oxidizing gas although practical considerations make concentrations less than 10% unattractive.

The reaction media may be neutral, acidic or alkaline. This permits the glycol containing feed solution to be used as prepared without adjustment of pH. A preferred condition is for the aqueous glycol feed to be neutral. No particular advantage results from the use of an alkaline feed. Indeed, the use of excess caustic, as taught in U.S. Pat. No. 3,342,858 for the oxidation of alkoxyalkanols, is a disadvantage since no improvement in selectivity or degree of conversion results and product recovery is complicated by the need to remove and dispose of salt by-products.

The reaction product can be recovered by conventional means. The catalyst can be removed by filtration or centrifugation and can be reused directly without further treatment. The filtrate or centrifugate containing the product can be concentrated by conventional means. Concentration can be carried out to varying degrees depending upon the intended use of the product. For example, if the dicarboxylic acid is to be used for esterification with an alcohol it may be only partially concentrated, the remainder of the solvent being removed during the subsequent esterification. If pure acid is required the solvent may be completely evaporated and the acid residue further purified by recrystallization, fractional crystallization, or similar conventional techniques familiar to those skilled in the art.

The yields of dicarboxylic acid produced by this invention are excellent with quantitative conversion of the polyethylene glycol being routinely obtained. Such excellent yields are highly unobvious since all prior teachings indicate that air oxidation of a polyalkylene glycol would result in very low rates or no reaction at all without catalysts, or with common oxidation catalysts, such as cobalt, manganese and the like.

The dicarboxylic acids of the present invention are known to be useful for the preparation of plasticizers, surfactants, polyesters, etc.

The following examples are given to further illustrate the invention, but it is to be understood that the invention is not to be limited in any way by the details described therein. In all the examples the gas pressure during oxidation is about 1 atmosphere.

EXAMPLE 1

A 3,000 milliliter all glass tubular reactor fitted with a fritted disc at the base for air dispersion, a thermometer, a drain port and attached to a double surface condenser is charged with 74 grams of a catalyst consisting of 5 percent platinum on powdered carbon and a solution of 200 grams diethylene glycol in 1,800 milliliters water. Air is metered into the mixture at a flow of 2,680 milliliters per minute as the mixture is heated to 50°C. The reaction is continued for 24.0 hours at 50°C. The product is recovered by filtration and the catalyst residue washed with warm water. The combined filtrate and washings are concentrated at reduced pressure to leave 239 grams of a white crystalline solid which proves to be 98.5 percent diglycolic acid. The diethylene glycol is completely oxidized and the yield to diglycolic acid is 93.2 percent.

EXAMPLE 2

The procedure of Example 1 is used except that 283 grams of triethylene glycol in 2,550 milliliters water is oxidized over the catalyst recovered from Example 1. Purification as in Example 1 gives 316 grams of a viscous, clear liquid containing 266 grams ethylene bis(-glycolic acid) (79.2 percent yield), 14.2 grams diglycolic acid (5.6 percent yield), and 7.7 grams glycolic acid (5.4 percent yield). The resulting acid mixture is useful in the preparation of polyesters and surfactants without further purification.

The invention has been described in detail with particular reference to certain preferred embodiments thereof, but it will be understood that variations and modifications can be effected within the spirit and scope of the invention as described hereinabove.

I claim:

1. A process whereby a polyethylene glycol of the formula

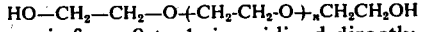

where $n$ is from 0 to 1, is oxidized directly to a dicarboxylic acid having the formula

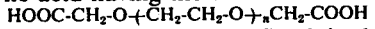

wherein $n$ is as previously defined, in the presence of a platinum catalyst selected from the group consisting of finely divided platinum and platinum supported on carbon and an oxidizing gas.

2. A process according to claim 1 wherein the oxidation is conducted in the presence of an inert solvent miscible with the feed glycol and the reaction products.

3. A process according to claim 2 wherein the inert solvent is selected from the group consisting of water, p-dioxane and tetrahydrofuran.

4. A process according to claim 3 wherein the inert solvent is water.

5. A process according to claim 2 wherein the concentration of glycol in the inert solvent is from about 3 percent by weight to about 20 percent by weight.

6. A process according to claim 5 wherein the concentration of the glycol in the inert solvent is from about 10 percent by weight to about 15 percent by weight.

7. A process according to claim 1 wherein the catalyst consists of from about 1 percent by weight to about 10 percent by weight of platinum supported on finely divided carbon.

8. A process according to claim 1 wherein the catalyst consists of from about 3 percent by weight to about 6 percent by weight of platinum supported on finely divided carbon.

9. A process according to claim 1 wherein the oxidation reaction is conducted at a temperature of from about 20°C. to about 80°C.

10. A process according to claim 9 wherein the temperature is from about 40°C. to about 50°C.

11. A process according to claim 1 wherein the reaction is conducted at a pressure of from about atmospheric to about 1500 psig.

12. A process according to claim 1 wherein the oxidizing gas consists of oxygen and an inert diluent gas such as nitrogen, helium, or argon.

13. A process according to claim 12 wherein the inert diluent gas is selected from the group consisting of nitrogen, helium, argon and carbon dioxide.

14. A process according to claim 1 wherein the oxidizing gas contains from about 10% by weight to about 100% by weight of oxygen.

15. A process according to claim 1 wherein the feed solution containing the polyethylene glycol is neither acidic nor alkaline.

16. A process according to claim 1 wherein no adjustment is made to the pH of the glycol containing feed solution prior to its oxidation.

* * * * *